United States Patent [19]
Möhlenkamp

[11] Patent Number: 6,023,654
[45] Date of Patent: Feb. 8, 2000

[54] METHOD FOR REFERENCING FIXED OBJECTS

[75] Inventor: Klaus Möhlenkamp, Düsseldorf, Germany

[73] Assignee: Mannesmann Aktiengesellschaft, Düsseldorf, Germany

[21] Appl. No.: 08/823,145

[22] Filed: Mar. 25, 1997

[30] Foreign Application Priority Data

Jun. 25, 1996 [DE] Germany ............................ 196 13 013

[51] Int. Cl.$^7$ ..................................................... G06G 7/78
[52] U.S. Cl. ........................ 701/208; 701/200; 701/212; 701/214; 340/988; 340/989; 340/990; 340/995; 342/457
[58] Field of Search ................................ 701/208, 25, 26, 701/200, 206, 207, 212, 214; 340/988, 989, 990, 995; 342/457

[56] References Cited

U.S. PATENT DOCUMENTS

| | | | |
|---|---|---|---|
| 5,272,638 | 12/1993 | Martin et al. ........................... | 701/201 |
| 5,731,978 | 3/1998 | Tamai et al. ............................. | 701/201 |
| 5,748,197 | 5/1998 | Guibas et al. .......................... | 701/119 |

*Primary Examiner*—William A. Cuchlinski, Jr.
*Assistant Examiner*—Arthur D. Donnelly
*Attorney, Agent, or Firm*—Cohen, Pontani, Lieberman & Pavane

[57] ABSTRACT

A method of referencing fixed objects on the earth's surface by associating an unequivocal code. The method including the steps of: a) defining a grid with a predetermined resolution and a predetermined position with respect to the surface of the earth, the grid having intersection points that are convertible by a first reversible algorithm into a geographical coordinate system; b) unequivocally mapping the objects on the intersection points of the grid; c) unequivocally associating a code in each case with the intersection points of the grid by a second reversible algorithm; and d) associating the code of the associated intersection point determined in step c) with the object in question.

20 Claims, 3 Drawing Sheets

Geografische Zuordnung

METHOD FOR REFERENCING FIXED OBJECTS

BACKGROUND OF THE INVENTION

1. Field of the Invention

The present invention relates to a method for referencing fixed objects on the surface of the earth by associating an unambiguous code.

2. Description of the Prior Art

Many traffic-telematic services presuppose the transmitting of information to a final instrument. Such a final instrument may, for instance, be installed in a vehicle or may be a portable instrument. The information is ordinarily provided by a central service station or a system of service stations. A large part of the information to be transmitted refers in this connection to geographical positions. Typical examples of this are any type of traffic information. It is therefore necessary that the position information transmitted be correctly associated so that the traffic information can be meaningfully used.

For the unambiguous associating of position data with fixed objects, which is also referred below to as referencing, various solutions are known and used in technical systems. The disadvantages of existing systems will be explained on a suitable example. Thus, in the so-called RDS/TMC system (Radio-Data System/Traffic Message Channel) traffic information is coupled to a hierarchically structured model (in accordance with location codes of the Alert-C Protocol) of the network of roads. A predefined network of roads is in this connection broken down into road sections and numbered consecutively. By definition of higher-order and lower-order sections a hierarchic structure is established. Thus, for instance, the entire length of Autobahn A 57 represents a section of higher order and for instance the stretch of A 57 between the Strümpp intersection and the Krefeld-Oppum exit or between the Kaarst intersection and the Neuss-Büttgen exit represent sections of lower order. Such individual sections can then be simply numbered consecutively, as shown in FIG. I for a portion of a map. Information is then transmitted in each case with reference to the number of the previously defined section. Such a method has the advantage of a minimal volume of data for the referencing upon the transmission of information.

A decisive disadvantage of this and many other methods is that the transmission of the information is dependent on the reference model (in this case, on the predetermined structure of the road network) and this reference model must be known also in the corresponding end instrument located at the user in order that the information can be understood correctly. A refining of the model is generally not possible. Different geographical models (for instance road maps of different manufacturers) cannot be used because of the different structure. Upon change of the structure, the presentation of the data becomes increasingly chaotic so that problems of compatibility can occur both between different end instruments and between different generations of the data structure.

Another known solution consists of coupling the referencing not with traffic-relevant structures such as, for instance, consecutively numbered road sections, but to use directly geodetic coordinates, as shown diagrammatically in FIG. 2. In technical use, the WGS-84 format (World Geodetic System) would, for instance offer itself here, in the same way as it is also used in the ordinary satellite navigation systems (GPS receivers). One disadvantage of this is that certain traffic-telematic applications, such as for instance navigation on large complicated intersections, require very high resolution and the available data material which is used by different manufacturers is in each case consistent only in itself. Upon the referencing of traffic objects, there are greater or lesser differences depending on the data material used, and thus problems of compatibility arise in the use of traffic-telematic services. An intersection, to be sure, is an intersection both on a map of manufacturer A and on one of manufacturer B, but the rule is that in each case there are associated with this intersection WGS coordinates which frequently differ from each other by up to 100 meters. The use of such coordinates, therefore, does not permit an association which is unambiguous for all manufacturers.

A further source of ambiguities and problems in association results from the description of larger complex objects by differently structured objects of lower order (reference elements). One example of this is an autobahn or expressway intersection with several entrances and exits (reference elements).

SUMMARY OF THE INVENTION

The object of the present invention is to provide a method for referencing fixed objects by associating an unambiguous code so that problems of compatibility are overcome at the smallest possible expense. It is a further object to provide a system for the carrying out the traffic-telematic services and a suitable end instrument, which overcomes the compatibility problems.

Pursuant to these objects, and others which will become apparent hereafter, one aspect of the present invention resides in a method having following steps of:

a) Defining a grid having a predetermined resolution (mesh size) and a predetermined position with respect to the surface of the earth, the intersection points of the grid being convertible into a geographical coordinate system by a first reversible algorithm.

b) Mapping the objects unequivocally on the intersection points of the grid.

c) Associating a code in each case unambiguously with the intersection points of the grid by a second reversible algorithm.

d) Associating the code of the associated intersection point which was determined in step c) with the specific object.

By a reversible algorithm there is understood here an algorithm with which the results obtained from the input data can be converted back again in reverse manner to the input data.

It is advisable to define the grid as an orthogonal or at least approximately orthogonal grid. In many cases it is advantageous to establish the grid as a distorted grid with a non-uniform mesh width, in which case the mesh width is narrower in regions having a large number of objects per unit of surface than in regions with fewer objects per unit of surface. The size of the grid is advantageously limited to a geographical region, for instance a country or a continent. In this way, with a predetermined length of the individual codes (number of characters), a higher resolution can be obtained. This relationship is to be taken into account when determining the size of the geographical region. For traffic-telematic applications, it has proven advisable to fix the mesh size of the grid to be defined within the range of 50 to 500 meters and, with particular preference, within the range of an order of magnitude of 100 meters. As a geographical coordinate system there is preferably used, in the method of the invention, an internationally used coordinate system such as, for instance the geographical coordinate system WGS-84. The mapping of the objects on the intersection points of the grid defined is effected preferably in the manner that an object is associated in each case to the intersection point which is closest to the object and that only in the event that another object has already been associated with that intersection point is a different intersection point in the vicinity of the object selected for the association.

The codes in step c of the method of the invention can be formed for instance by consecutive numbering of the individual intersection points of the grid. However, it is particularly advisable to use a procedure in which the codes in accordance with step c are formed in each case as a train of digits which are produced by placing the coordinates one after the other corresponding to a grid developed as a Cartesian coordinate system.

The referencing in accordance with the invention is not only suitable for real objects but also for virtual objects. Thus, not only can real objects such as intersections, road branchings, road construction works (for instance bridges or tunnels) and cities (and therefore objects of a considerable area) be referenced, but also virtual objects such as countries, states or other administrative districts. A corresponding point on the grid (for instance, the point lying closest to the center of the area) is simply unequivocally associated in each case with these objects. The codes of the objects obtained can be stored for further use, for instance, into a reference table in which attributes are assigned to the codes. As particularly important attributes, mention may be made, for instance, of names and/or type of road and/or size of a region and/or a reference to other objects.

A system for the carrying out traffic-telematic services with a central station which is equipped with an electronic data-processing system and collects and stores traffic information and makes it available to users over a communication channel. The system also has a plurality of final instruments which can receive traffic information from the central office and make it available to the user in question. The programming of the electronic data-processing system is developed so that objects which are important from a traffic standpoint are referenced with the above-indicated method steps a to d.

An end instrument for a such a system has an electronic processing device which is programmed as a decoder for decoding references in traffic information which are referenced with the inventive method. There is advisedly stored in a memory of the end instrument a reference table in which the codes of the objects are contained and the attributes are assigned to the codes, in particular names and/or type of road and/or size of a region and/or a reference to other objects.

The present invention overcomes the aforementioned compatibility problems of the prior art. This will be explained in detail below on the example of traffic information and the associating thereof with a network of roads. However, the use of the method of the invention is not limited to this field but it can be used, in general, for the associating of information with a geographical position.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
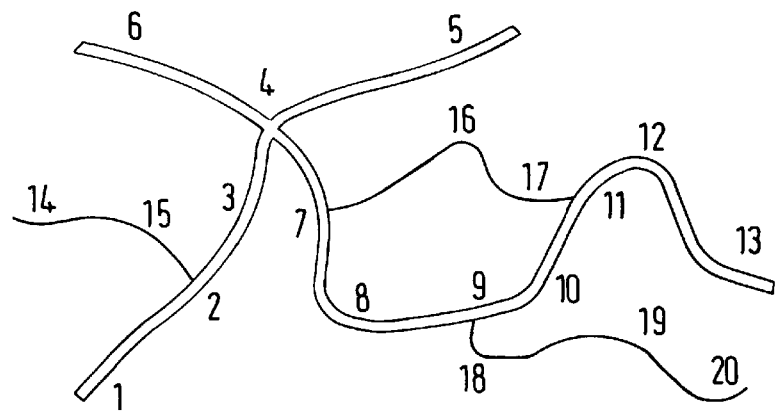
FIG. 1 is a portion of a road map with numbered road sections.
Figure 2:
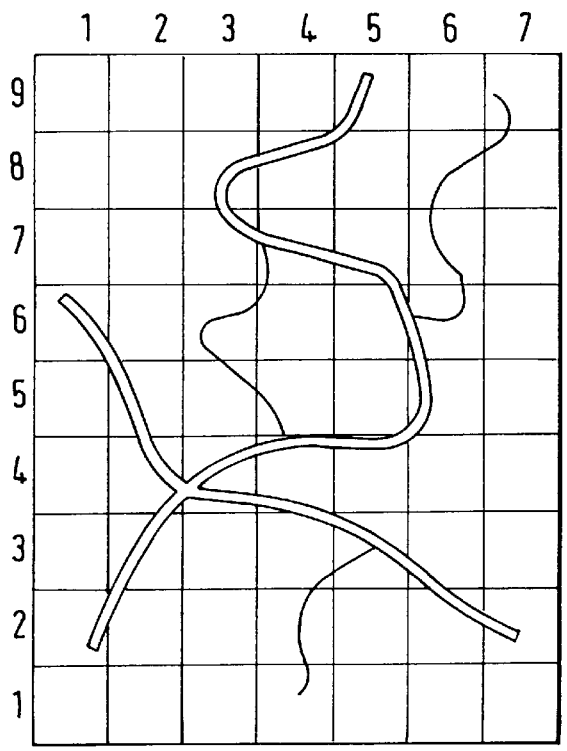
FIG. 2 is a portion of a road map having a coordinate grid.

By the method of the invention, it is endeavored to make the geographical data structure as simple and universal as possible. The principle of the solution hereof is based on features such as known from the two methods of the prior art explained above in connection with FIGS. 1 and 2 and includes them in a new, particularly advantageous manner.

The density of information in a road map differs greatly. Thus, a very large amount of information is present in a very small space for the showing of city streets or an expressway intersection. Conversely, a large amount of information (for instance on the flow of traffic) is available also for such objects. The basic idea of the invention is now to adapt, in the same way as in pertinent methods of finite-element calculation, a network structure to the problem present in each case and define additional grid points at particularly interesting places. These additional grid points, however, are not defined on the basis of their actual coordinates as in finite-element calculation but are converted into a fictitious grid. For this purpose, a simple grid is defined on the surface of the earth. This grid is preferably based on a current coordinate system. This system, however, must not be either square or rectangular. An essential feature of the invention is that the grid coordinates are arbitrarily defined coordinates.

Use of the method of the invention is not limited to a two-dimensional grid, but it is also advantageous for referencing in three-dimensional systems. In the following, however, reference will be had to its preferred use in road traffic, so that in the further description a two-dimensional projection grid referred to the surface of the earth will be regularly taken as basis.

The grid actually established will be mapped reversibly convertible in accordance with a predetermined algorithm on this coordinate network, i.e. distorted. An example will make this clear.

If a section of a highway is ascribed the pair of coordinates of (17;34), (18;34), (19;35), etc. on the basis of its actual geographical position, additional features of this section, such as an entrance, for instance, are distributed in accordance with the predetermined algorithm (and therefore arbitrarily) on the next free coordinate pairs (for instance on (18;35)). Since the entrance now no longer lies at its real position coordinate this grid is a distorted position grid. By the use of correspondingly developed algorithms, the inaccuracy in the geographical association connected with this can, however, be limited to a few grid spacings. The great benefit of this lies in the fact that, with a suitable selection of the grid spacing, a large number of traffic-telematic applications can he realized without having to tolerate the problems discussed previously. For uses in traffic telematics, an edge length of the order of magnitude of 100 meters has proven particularly suitable. Larger or smaller grid spacings are, of course, possible, but they must be considered against the background of the efficiency of transmission, i.e. the smaller the edge length the more grid points there are and the longer the code for identifying a grid point. With the selection of a grid spacing of 100 meters, an association with the actual geographical position can be expected regularly with a precision of a few hundred meters. This decision is sufficient in order still to reasonably relate even detailed traffic information to road sections and on the other hand completely to overcome the negative effects of inaccuracies or contradictions on the plane of the digital map.

Figure 3:
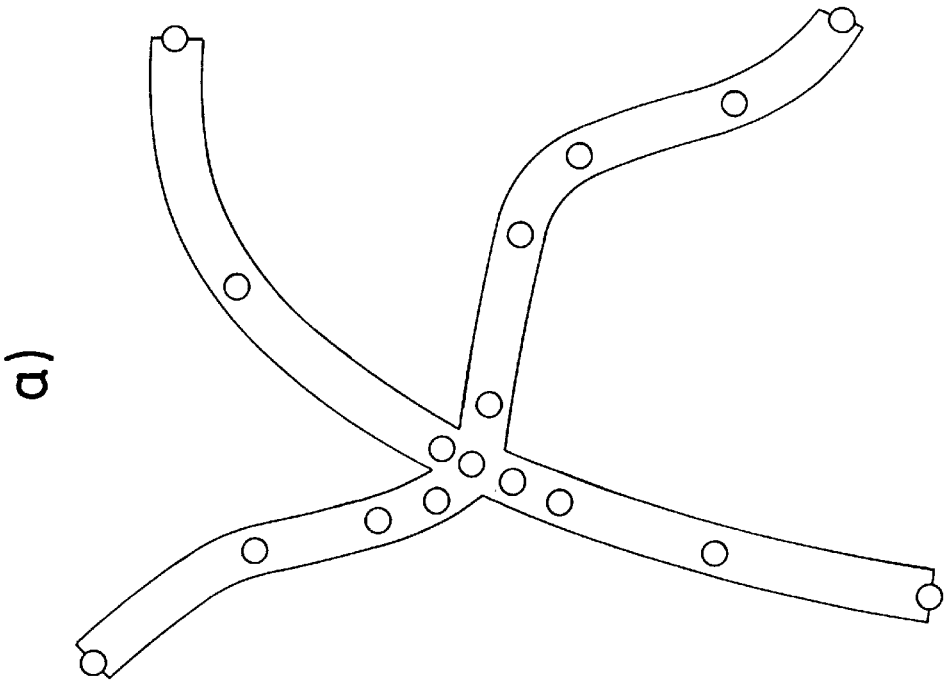
FIG. 3 shows the real position of objects in a portion of a map and the referencing thereof in accordance with the present invention.
Figure 3:
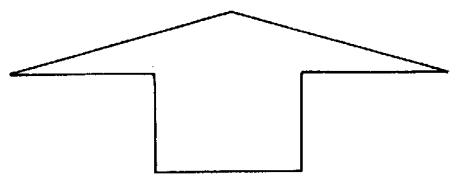
Figure 3:
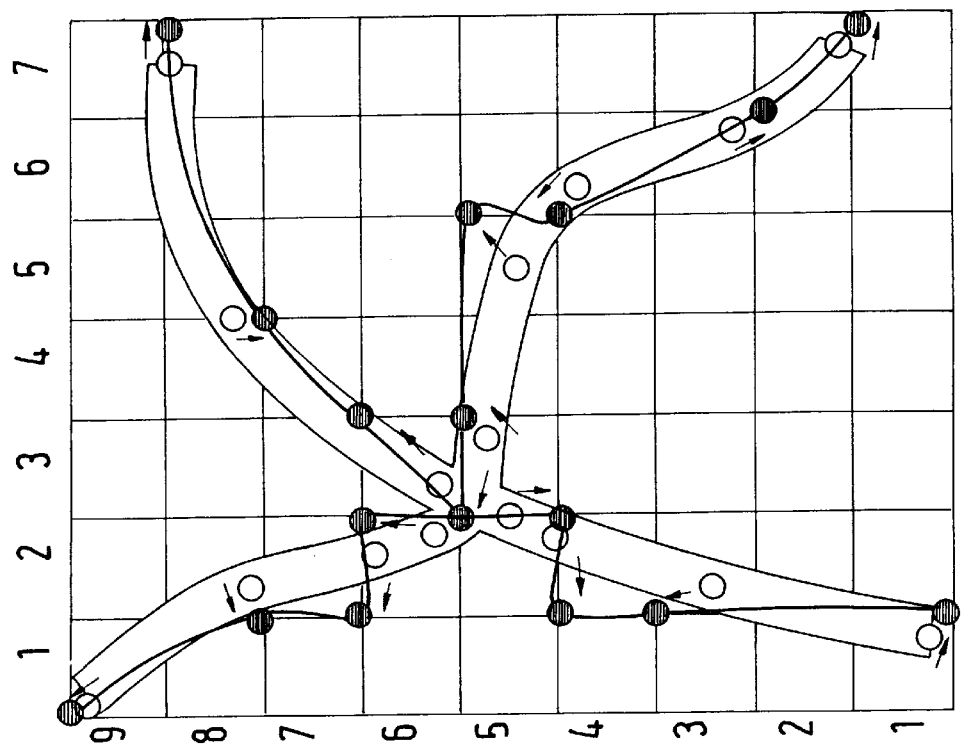

The method in accordance with the invention is shown by way of example in FIG. 3. FIG. 3a shows a portion of a map having a network of sections which has various points of interest to traffic, and therefore fixed objects such as, for instance, an expressway intersection with the various branchings, regular expressway entrances and exits, parking spaces, rest areas, etc. The objects of this portion of the map are now, as shown by way of example in FIG. 3b, associated with the grid intersection points of a predefined coordinate network. The actual position of the objects is indicated in FIG. 3b by (open) circles, while the distortion effected by the mapping algorithm used is shown by corresponding black dots. The algorithm provides that it is attempted first of all to associate an object with the grid intersection point which is in each case closest. If this grid intersection point, however, is already occupied by another object, then another free grid intersection point in the vicinity is arbitrarily (but unequivocally reversibly) determined, as indicated by the arrows entered. In this way, to be sure, a certain distortion is obtained as compared with the actual position, but a completely unambiguous association of the objects with the grid intersection points is assured.

The present invention has advantages which are particularly decisive in traffic telematics, namely:

The representation of the area is independent of the data structure of individual maps.

Every digital map offers a locating function, i.e. the associating of a general xy-coordinate to certain contents of the map. The use of very different maps (different manufacturers, BITMAP or VECTOR presentation) for traffic-telematic services is readily possible by the inventive method and requires at most a simple, automatically effected conversion of different xy-representations. Despite the coarsening effected, no substantial compatibility problems are to be expected.

The transmission of information is independent of existing road maps. Thus, area-related information such as weather data can be referenced in a very simple manner and can be transmitted and processed as part of the specific use.

If the grid coordinates are coarsened for the purpose of evaluation or presentation in the final instrument, since for instance a positional resolution of one kilometer is considered entirely sufficient, then the grid coordinate already corresponds to the geographical position. In this way, a large number of interesting traffic-telematic services can already by realized directly and without a road map or a coordination table (for instance RDS/ TMC). Examples of this are graphic indications ("Traffic jam on A3, 5 km ahead") or simple homing services.

The compatibility of devices of different manufacturers is assured.

The exchange of data internationally can be easily effected.

The transmission in xy-format makes it possible in a very simple manner to obtain graphical displays in the end instruments.

A refinement of the grid is in principle possible if necessary. In such a case, the internal, finer subdivision of the grid can be transmitted as additional information to the specific end instrument. However, it is also possible to send a few recognition bits for the definition of the scale.

Figure 4:
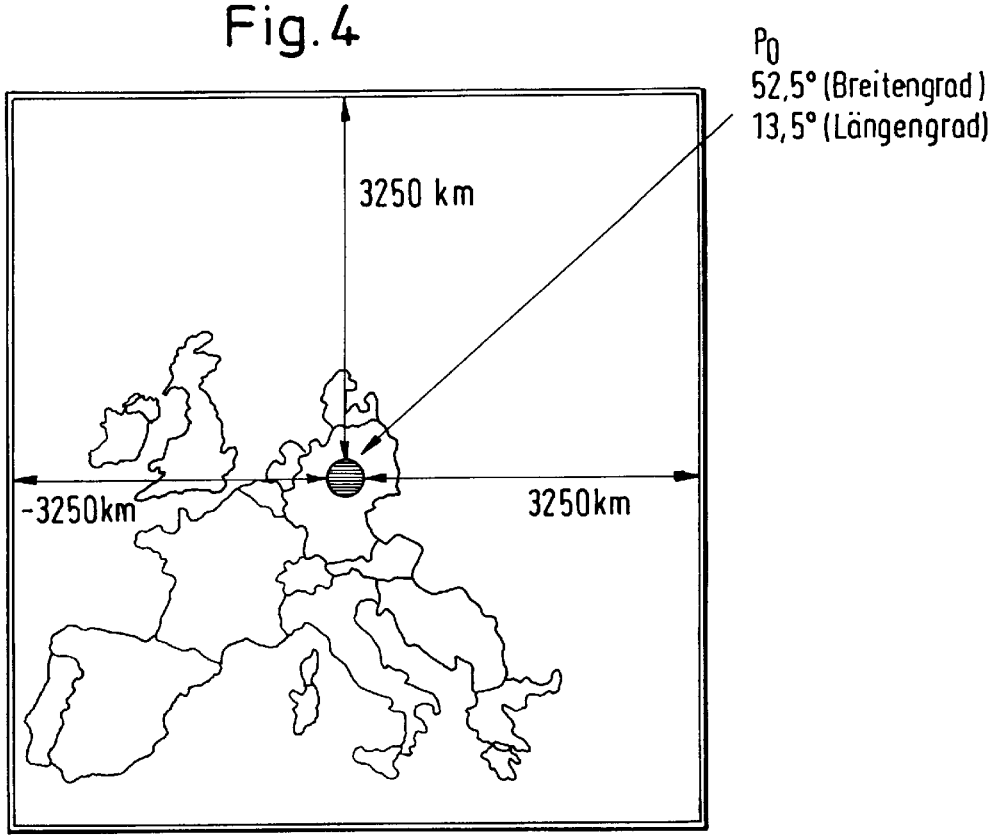
FIG. 4 shows a geographical region for a grid definition.

The following example explains the referencing in accordance with the invention of objects by association of an unequivocal code. This example refers to the geographical region of Europe, for which a uniform coding (geocoding) is to be assured. As shown in FIG. 4, there is established for this a square region having an edge length of 2×3250 km=6500 km, the center point of which has been placed on a selected reference point $P_0$ having the following geodetic degrees in the WGS-84 coordinate system:

Degree of latitude 52.5°

Degree of longitude 13.5°.

In order to be able suitably to code points in this 6500× 6500 km² area, 2×16 bits (65536×65536 possible grid points) are to be used. With this code length, therefore, a square grid with a mesh size (edge length) of 100 meters can be established. For the unequivocal reversible conversion of geographical coordinates (WGS-84) into the geocode of the present example in accordance with the invention, the reference point $P_0$ (latitude 52.5°, longitude 13.5°) is first of all defined as origin of a Cartesian coordinate system for the area selected. The positions of individual objects are determined by their distances in each case in west-east direction (x-direction) and south-north direction (y-direction) from this point of origin $P_0$. Distances in west and south directions from this point of origin $P_0$ are provided with a negative sign. In the practical application these distances can be coded in 16 bits in the two's complement. The formulas for the reversible conversion of the geographic WGS-84 coordinates of a point $P_1$ are:

$$x_1=(\lambda_1-\lambda_0)400300/360° \cos \Psi_1,$$

$$y_1=(\Psi_1-\Psi_0)400300/360°$$

Herein:

$\lambda_0$=degrees of longitude of the point of origin $\lambda_1$=degrees of longitude of the point to be referenced $\Psi_0$=degrees of latitude of the point of origin $\Psi_1$=degrees of latitude of the point to be referenced The numerical value 400300 in the formula represents the circumference of the equator of the globe of about 40030 km, measured in grid-spacing units (100 meters).

Figure 5:
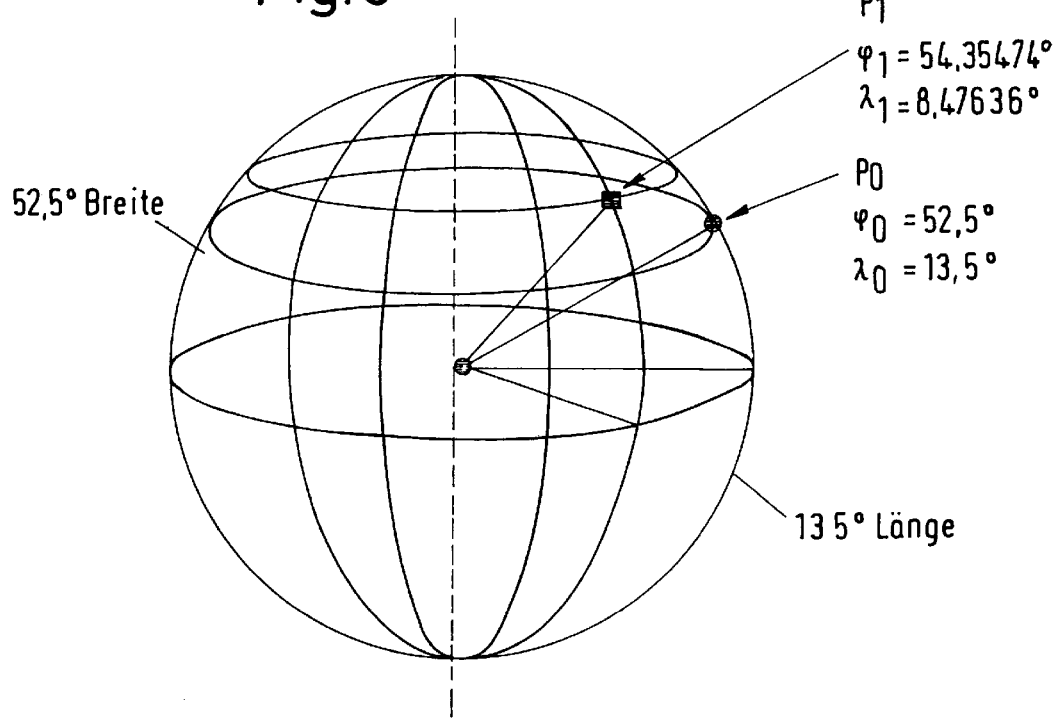
FIG. 5 shows a model of the globe for explaining the referencing of an example point.

The following geocode results with these relationships for the point $P_1$ having the WGS-84 coordinates $\Psi_1$=54.35474° and $\lambda_1$=8.47636° which is shown in FIG. 5 in addition to the point of origin $P_0(\Psi_0$=52.5°; $\lambda_0$=13.5°):

$$\text{East-West distance } x_1=(8.47366°-13.5°)400300/360° \cos(54.35474°)$$

$$x_1=-3255$$

$$\text{North-South distance } y_1=(54.35474°-52.2°)\ 400300/360°$$

$$y_1=2062$$

Thus the geocoding (2062; −3255) is obtained for the point P1. This information can be coded in each case in 16 bits (two's complement). Both 16-bit lines are simply attached to each other in the sequence x and y to form a 32-bit character sequence which is converted into a number and represents the geocode.

The geocode of the point P1 which is thus obtained can be easily converted back unambiguously into geographical coordinates. For this, the following formulas are used:

$$\Psi_1 = y_1\ 360°/40300 + \Psi_0$$

$$\lambda_1 = x_1\ 360°/40300 \cos \Psi_1 - \lambda_0$$

In this connection the degree of latitude $\Psi_1$ is first of all determined and then, using the value $\Psi_1$, the degree of longitude $\lambda_1$. Upon the calculation of $\cos \lambda_1$ a limiting to nine significant positions after the decimal point (32 bits) is permissible for sufficient accuracy.

The invention is not limited by the embodiments described above which are presented as examples only but can be modified in various ways within the scope of protection defined by the appended patent claims.

I claim:

1. A method of referencing fixed objects on the earth's surface by associating an unequivocal code, comprising the steps of:
   a) defining a grid with a predetermined resolution and a predetermined position with respect to the surface of the earth, the grid having intersection points that are convertible by a first reversible algorithm into a geographical coordinate system;
   b) unequivocally mapping the objects on the intersection points of the grid;
   c) unequivocally associating a code in each case with the intersection points of the grid by a second reversible algorithm; and
   d) associating the code of the associated intersection point determined in step c) with the object in question.

2. A method according to claim 1, wherein the grid defining step includes defining the grid as an approximately orthogonal grid.

3. A method according to claim 1, wherein the grid defining step includes defining the grid as a distorted grid of non-uniform mesh width, the mesh width being narrower in regions having a large number of objects per unit of area than in regions with fewer objects per unit of area.

4. A method according to claim 1, including limiting size of the grid to a geographical region.

5. A method according to claim 4, including determining the size of the geographical region and the resolution of the grid as a function of a predetermined length of the code.

6. A method according to claim 5, including determining the size of the geographical region and the resolution of the grid as a function of a number of characters of the code.

7. A method according to claim 1, including determining a mesh size of the grid for traffic-telematic applications within a range of 50 to 500 meters.

8. A method according to claim 7, wherein the size of the mesh is on an order of magnitude of 100 meters.

9. A method according to claim 1, including utilizing an internationally valid coordinate system as the geographical coordinate system.

10. A method according to claim 9, including using the WGS-84 system as the geographical coordinate system.

11. A method according to any of claim 1, wherein the mapping step includes associating an object in each case with an intersection point which lies closest to the object and only in the event that another object has already been associated with the intersection point is a different intersection point in the vicinity of the object selected for the association.

12. A method according to claim 1, wherein the code associating step includes forming the codes by consecutive numbering of the individual intersection points of the grid.

13. A method according to claim 1, wherein the code associating step includes forming the codes, in each case, as a sequence of digits which are produced by attaching the coordinates to each other in accordance with a grid developed as a Cartesian coordinate system.

14. A method according to claim 1, including referencing virtual objects in addition to real objects.

15. A method according to claim 14, including referencing intersections, road branchings, road structural works, cities, states, countries and other administrative districts as objects.

16. A method according to claim 1, including feeding the codes of the objects in each case into a reference table in which attributes are assigned to the codes.

17. A method according to claim 16, including assigning at least one of a name, a type of road, a size of a region, and a reference to other objects as an attribute.

18. A system for performing traffic-telematic services, comprising: a central station having an electronic data-processing system and being operative to collect and store traffic information and make it available to users over a communication channel; and a plurality of end instruments operative to receive traffic information from the central station and make it available to a corresponding user, the electronic data-processing system being programmed so that objects of traffic importance are referenced in the traffic information by a method of referencing fixed objects on the earth's surface by associating an unequivocal code, which method includes the steps of:
   a) defining a grid with a predetermined resolution and a predetermined position with respect to the surface of the earth, the grid having intersection points that are convertible by a first reversible algorithm into a geographical coordinate system;
   b) unequivocally mapping the objects on the intersection points of the grid;
   c) unequivocally associating a code in each case with the intersection points of the grid by a second reversible algorithm; and
   d) associating the code of the associated intersection point determined in step c) with the object in question.

19. An end instrument for a system for performing traffic-telematic services, the end instrument comprising electronic data processing means programmed as a decoder for decoding references in traffic information which are referenced by a method of referencing fixed objects on the earth's surface by associating an unequivocal code, which method includes steps of:
   a) defining a grid with a predetermined resolution and a predetermined position with respect to the surface of the earth, the grid having intersection points that are convertible by a first reversible algorithm into a geographical coordinate system;
   b) unequivocally mapping the objects on the intersection points of the grid;
   c) unequivocally associating a code in each case with the intersection points of the grid by a second reversible algorithm; and
   d) associating the code of the associated intersection point determined in step c) with the object in question.

20. An end instrument according to claim 19, wherein the end instrument has a memory that stores a reference table of attributes for assignment to the codes.

* * * * *